United States Patent
Nyman

(10) Patent No.: US 6,869,061 B1
(45) Date of Patent: Mar. 22, 2005

(54) VALVES, AND SEISMIC SOURCES INCORPORATING THE VALVES

(75) Inventor: Tommi Nyman, Prevessin (FR)

(73) Assignee: WesternGeco, L.L.C., Houston, TX (US)

( * ) Notice: Subject to any disclaimer, the term of this patent is extended or adjusted under 35 U.S.C. 154(b) by 212 days.

(21) Appl. No.: 10/130,518

(22) PCT Filed: Nov. 23, 2000

(86) PCT No.: PCT/IB00/01737

§ 371 (c)(1),
(2), (4) Date: Aug. 14, 2002

(87) PCT Pub. No.: WO01/40690

PCT Pub. Date: Jun. 7, 2001

(30) Foreign Application Priority Data

Dec. 1, 1999 (GB) .............................................. 9928245

(51) Int. Cl.$^7$ ......................... F16K 51/00; F16K 31/00
(52) U.S. Cl. .................................... 251/149.5; 251/205
(58) Field of Search .................. 251/142, 149.1–149.9, 251/205–209, 309–313

(56) References Cited

U.S. PATENT DOCUMENTS

| | | | | |
|---|---|---|---|---|
| 4,257,560 A | * | 3/1981 | Diamond | 239/337 |
| 5,269,347 A | * | 12/1993 | Beasley | 137/864 |
| 5,615,170 A | * | 3/1997 | Chelminski | 367/15 |

FOREIGN PATENT DOCUMENTS

| | | | |
|---|---|---|---|
| FR | 2623593 | * | 11/1987 |
| GB | 1069504 | * | 5/1967 |

* cited by examiner

Primary Examiner—Paul J. Hirsch
(74) Attorney, Agent, or Firm—WesternGeco, L.L.C.

(57) ABSTRACT

A valve has an input (3,13) and first and second outputs (4, 5; 14, 15). The valve also has a closure member (2, 12) that is operable to isolate the first output from the input, to isolate the second output from the input, to isolate both outputs from the input, or to connect both outputs to the input.

In one embodiment, the input (13) and the first and second outputs (14, 15) are disposed in a flat valve face (16) in a valve body. The closure member (12) has a sealing face (17') that is biased against the valve face (16). A recess (18) is provided in the sealing end face (17') of the closure member (12). The recess is so shaped, and the input (13) and outputs (14, 15) are so positioned that rotation of the closure member (12) by successive angles of 90° puts the valve in the following states: both outputs connected to the input, one of the outputs connected to the input, the other of the outputs connected to the input, and both outputs isolated from the input.

The rotation of substantially 90° of the closure member 12 is achieved by releasing a bias on the closure member 12, and allowing it to move axially. A worm groove (21, 22) provided on the surface of the closure member (12) derives rotary movement of the closure member (12) from its axial movement.

19 Claims, 4 Drawing Sheets

VALVES, AND SEISMIC SOURCES INCORPORATING THE VALVES

This invention relates to valves, and is more particularly but not exclusively concerned with remotely operable valves for use with seismic sources.

An airgun is a well-known seismic source. An airgun consists essentially of a container, normally a cylinder, that is charged with air at a high pressure such as several thousand p.s.i. In order to fire an airgun, a port in the airgun is opened by a solenoid-operated valve, thereby releasing the high-pressure air contained within the airgun. The released air forms a rapidly expanding bubble, so creating a powerful pressure wave. Information about the geological formations under the seabed can be deduced from the reflections of the pressure wave.

Seismic sources are known which consist of an array of airguns, which can be fired individually. Such an airgun source is disclosed in, for example, U.S. Pat. No. 4,686,660. This patent discloses a marine seismic source in which a plurality of airguns are suspended from a float. The airguns are arranged either singly or in clusters of two or more airguns.

Where airguns are arranged in a cluster, each airgun in the cluster is continuously connected to a source of high-pressure air. It is desirable to provide means for isolating each of the airguns in the cluster from the supply of high-pressure air, so that an airgun that develops a leak can be isolated. This is conventionally done by providing each airgun in a cluster with an individual shut-off valve that can shut-off the supply of high-pressure air to the airgun.

This prior art approach has the disadvantage that a separate shut-off valve is required for each airgun in the cluster. Moreover, a conventional valve of the type generally known as a "ball-valve" has been used as the shut-off valve, and these have spherical or cylindrical sealing surfaces which are difficult to manufacture accurately.

A first aspect of the present invention provides a valve comprising: a valve face having at least one input and at least one output; and a closure member having a sealing face, the sealing face being adapted to seal against the valve face whereby, by changing the orientation of the closure member relative to the valve face, the input can be connected to or isolated from the output and wherein the closure member is normally biased towards the valve face, and wherein releasing and re-applying the biasing of the closure member causes the orientation of the closure member relative to the valve face to change, thereby to change the state of the valve.

It is relatively straightforward to automate the operation of releasing the biasing on the closure member, so that automatic operation of the valve may easily be accomplished.

Preferably, the valve face and the sealing face are both substantially flat. As a result, the need to produce accurate spherical sealing surfaces is eliminated and thus the manufacture of the valve is simplified.

In a preferred embodiment, releasing and re-applying the biasing on the closure member, causes the closure member to rotate about its axis relative to the valve face.

In a preferred embodiment, releasing the biasing on the closure member causes closure member to move away from the valve face, and re-applying the biasing the closure member to move toward the valve face. In a particularly preferred embodiment, the valve is provided with means for deriving rotation of the closure member from movement of the closure member.

A second aspect of the present invention provides a seismic source comprising: a valve having an input and first and second outputs; an air supply connected to the input of the valve; and first and second airguns connected to respective ones of the first and second outputs of the valve; wherein the valve is operable selectively to isolate the first airgun from the air supply, or to isolate the second airgun from the air supply, or to isolate both airguns from the air supply or to connect both airguns to the air supply.

In a seismic source according to this second aspect of the invention, a cluster of two airguns is provided with a single valve that can be used to shut-off either one of the airguns from the air supply while keeping the other airgun connected to the air supply, for example if one of the airguns should develop a leak. Furthermore, it is possible to isolate both airguns from the air supply if both airguns should develop leaks.

Further preferred features of the invention are set out in the other dependent claims.

A preferred embodiment of the present invention will now be described by way of illustrative example with reference to the accompanying drawings, of which:

Figure 2:
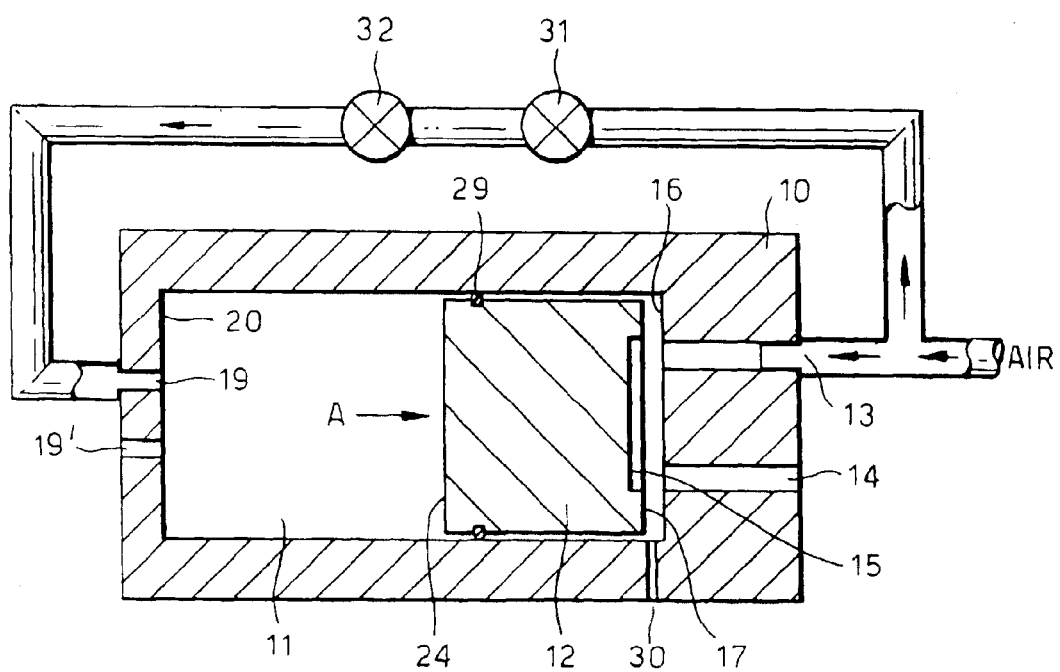
FIG. 2 is a schematic sectional view of a valve according to a second embodiment of the invention.
Figure 6:
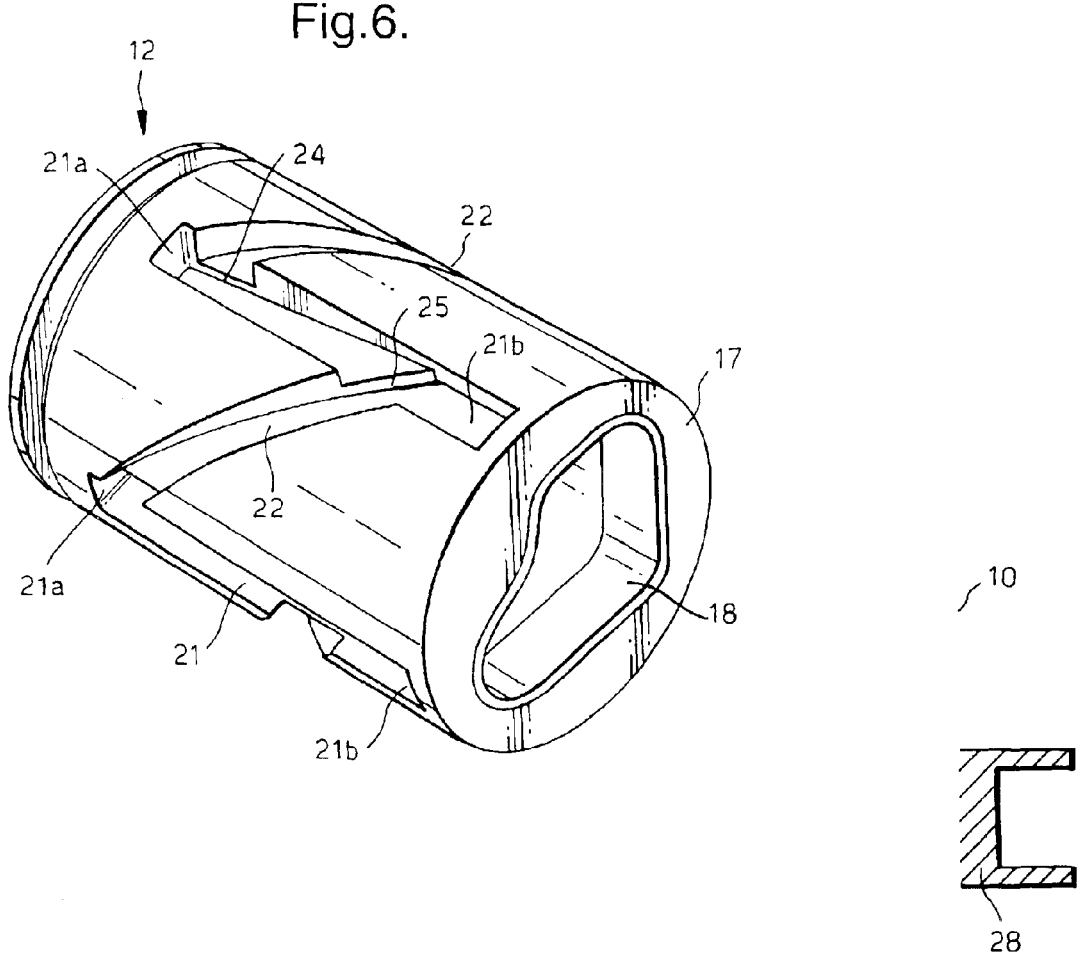
Figure 7:
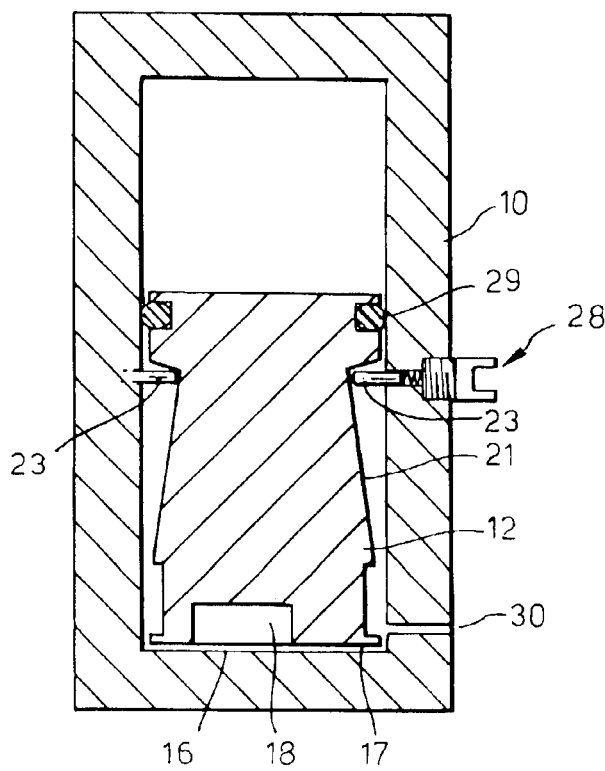

FIGS. 5(a) to 5(d) schematically show the effect of altering the orientation of the closure member of the valve of FIG. 2;

FIG. 6 is a perspective view of the closure member of the valve of FIG. 2;

FIG. 7 is a sectional view of the valve of FIG. 2; and

Figure 8:
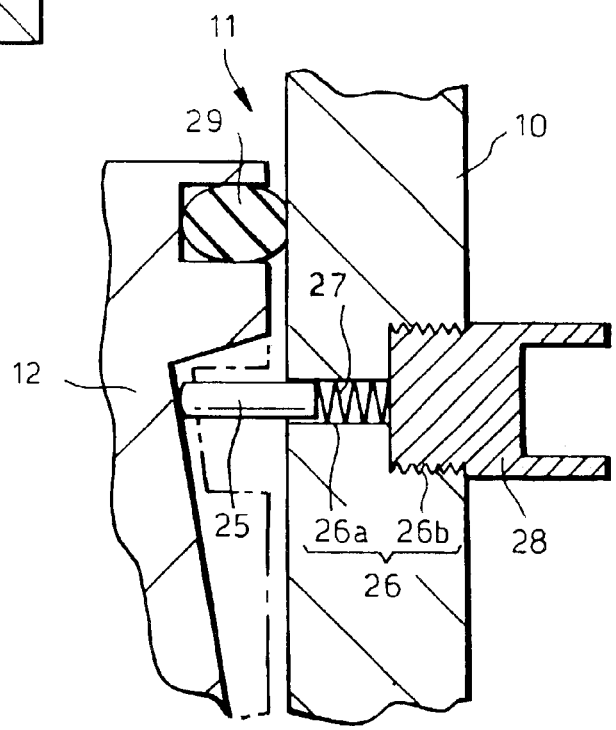

FIG. 8 is a partial enlarged view of FIG. 7.

Figure 1:
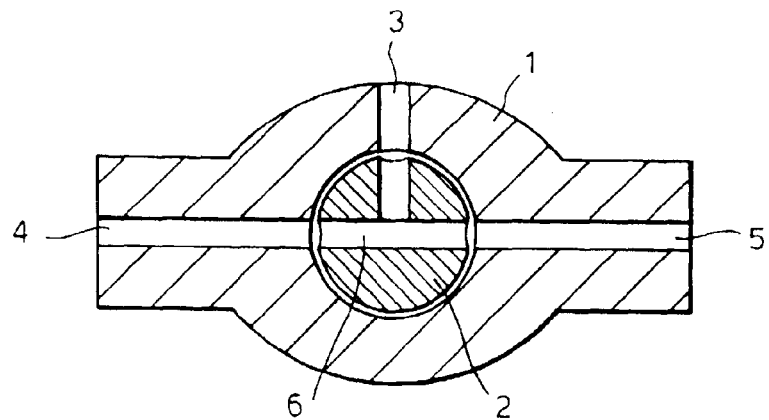
FIG. 1 is a schematic view of a valve according to a first embodiment of the invention.

A valve according to a first embodiment of the invention is shown schematically in FIG. 1. In this embodiment, the valve is embodied as a valve of the type generally known as a "ball-valve". The valve essentially comprises a valve body 1 which has a hollow interior, and a closure member or "ball" 2 is disposed within the hollow interior of the valve body. The closure member 2 has the form of a solid of revolution, such as a sphere or a cylinder. The valve body 1 is provided with an input 3 for compressed air, and two outputs 4, 5. When the valve is used with a cluster of two airguns, one output 4 is connected to a first airgun, and the other output 5 is connected to a second airgun.

A through passage 6 that is substantially "T"-shaped is provided through the closure member 2. When the closure member is in the orientation shown in FIG. 1, the through passage 6 connects the input 3 to both outputs 4, 5. If the closure member 2 is rotated by 90° clockwise, about an axis out of the paper, then the passage 6 will connect the input 3 to the second output 5, but not to the first output 4. Similarly, if the closure member 2 is rotated by 90° anti-clockwise from the orientation shown in FIG. 1 then the input is connected to the first output 4 by the passage 6, but the second output 5 is isolated from the input 3.

Finally, if the closure member 2 is rotated by 180° from the orientation shown in FIG. 1, the passage 6 will not connect the input 3 with either of the outputs 4, 5. Both outputs will be isolated from the input. (Although the valve can be closed—that is, both outputs isolated from the input—by turning it through any angle other than +90° it is generally easier to turn the valve off by rotating the valve by 180° from the position shown in FIG. 1 to close the valve. In this way, the four states of the valve are obtainable by four rotations each of 90°.)

A valve having the functionality of the valve shown in FIG. 1 allows the air supply to each airgun in a cluster of two airguns to be controlled using a single valve. If an air supply is connected to the input 3 of the valve and each output 4, 5 of the valve is connected to an airgun, it is possible to isolate either one of the airguns from the air supply while keeping the other connected to the air supply, to isolate both airguns from the air supply at once, or to connect the air supply to both airguns at once. Thus, it is possible to isolate the airguns in the cluster individually or together from the air supply.

It is highly desirable that there is a fluid tight seal between the closure member 2 and the valve body 1, to prevent a gas applied at the input from leaking to a "closed" outlet. In principle, this sealing can be achieved by choosing the dimensions of the closure member so as to make a fluid-type seal between the closure member and the valve body It is, however, preferable to provide a sealing member (not shown) between the closure member 2 and the valve body 1 so that an air-tight seal is formed between the closure member and the seal. The seal can be metallic, or alternatively it can be formed of a resilient material such as a plastics material.

FIGS. 2 to 5(a)–(d) are schematic views of a valve according to another embodiment of the present invention. The valve is shown in more detail in FIGS. 6 to 8.

As shown in FIG. 2, the valve comprises a valve body 10 that has a hollow interior 11. The hollow interior 11 of the valve body is cylindrical in shape. A piston 12 having a cylindrical external cross-section is disposed within the hollow interior. The piston 12 is arranged to be a sliding, sealing fit within the interior 11 of the valve body 10, for example by providing a sealing member 29 around the circumference of the piston. That is, the piston is able to move backwards and forwards within the interior 11 of the valve body 10, but fluid communication between the volume above the piston (that is, the volume to the left of the piston as seen in FIG. 2) and the volume below the piston is substantially prevented.

An input 13 and two outputs 14, 15 are provided in one end face 16 of the interior of the valve body. This end face 16 acts as a valve face since, when the piston is at one end of its travel (to the right in FIG. 2), one end face 17' of the piston makes contact with the valve face 16 and seals against it.

Figure 3:
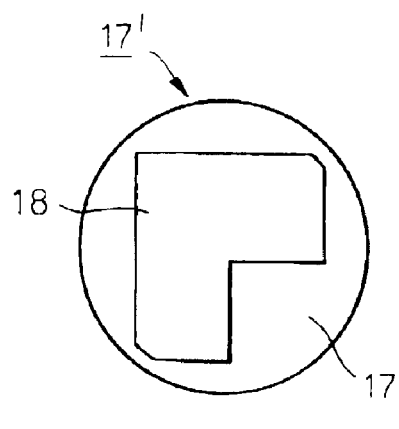
FIG. 3 is a schematic view of the sealing face of the closure member of the valve of FIG. 2.

The end face 17' of the piston nearest the valve face 16 is substantially flat and is provided with a recess 18. The recess is generally "L"-shaped, as shown in FIG. 3, which is a view of the end face 17' seen from the direction of the arrow A in FIG. 2. The recess 18 is also shown in FIG. 6. The flat part 17 of the end face 17' of the piston where the recess 18 is not provided acts as a sealing face. When the piston is at the right-hand end of its travel in FIG. 2, the flat part 17 of the end face 17' of the piston seal against the valve face 16. The end face 17' therefore acts as a sealing end face, and the flat part 17 act as a sealing portion.

Figure 4:
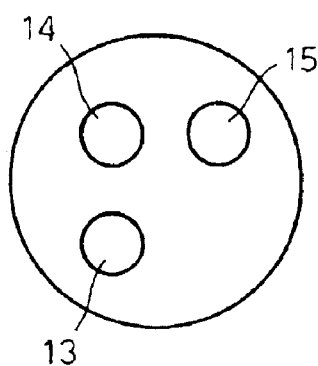
FIG. 4 is a schematic view of the valve face of the valve of FIG. 2.

The arrangement of the input 13 and the two outputs 14, 15 on the valve face of the valve body 10 is shown in FIG. 4. It will be seen that they are arranged at three corners of a rectangle, and so also have a generally "L"-shaped arrangement.

Figure 5A:
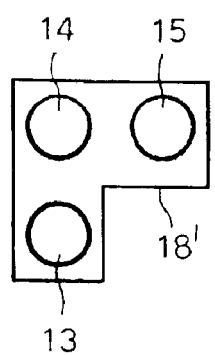

FIGS. 5(a) to 5(d) shows how switching of the valve is achieved by rotating the piston 12 relative to the valve body 10. These figures show the boundary 18' of the recess 18 relative to the input 13 and the outputs 14, 15. With the piston oriented as shown in FIG. 5(a) relative to the valve body, the recess 18 in the sealing end face 17' of the piston 12 is disposed over the input 13 and over both outputs 14, 15. The input is therefore connected to both outputs by means of the recess 18.

If the piston is rotated by 9° anti-clockwise about its axis from the orientation shown in FIG. 5(a) ("anti-clockwise" is with reference to FIGS. 5(a)–5(d)), then the recess 18 is disposed over only the input 13 and the first output 14, and it is not over the second output 15. The second output 15 is covered by the sealing portion 17 of the sealing end face 17', and is therefore isolated from the input 13.

Figure 5B:
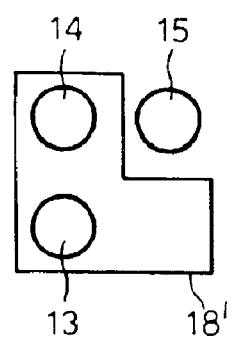
Figure 5C:
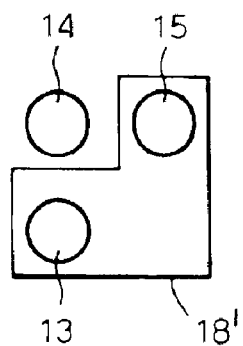

Rotating the piston 12 by a further 90° anti-clockwise from the orientation of FIG. 5(b) places the groove 18 over the input 13 and the second output 15, but not over the first output 14, as shown in FIG. 5(c). The sealing portion 17 of the sealing end face 17' is over the first input 14. The first output 14 is therefore isolated from the input 13, whereas the second output 15 is connected to the input 13.

Figure 5D:
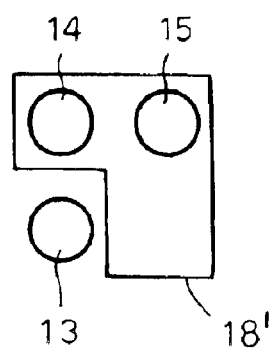

A further 90° anticlockwise rotation of the piston places the groove 18 over both outputs 14, 15 but not over the input, as shown in FIG. 5(d). In this orientation the sealing portion 17 of the sealing end face 17' is adjacent the input. Both outputs 14, 15 are therefore isolated from the input.

A further rotation of 90° anticlockwise returns the valve to the position shown in FIG. 5(a).

It can thus be seen that the principle of operation of the valve of FIGS. 2 to 5(d) is to some extent similar to that of the valve shown in FIG. 1. In both cases, rotation of the closure member of the valve by 90' changes the state of the valve. However, in a valve of FIGS. 2 to 5(d) the sealing between the closure member (that is the piston 12) and the valve face 16 is effected by a pair of substantially flat surfaces. These are significantly easier to manufacture than cylindrical or spherical sealing surfaces and thus, it is easier to obtain an air-tight seal.

A further advantage of the valve shown in FIGS. 2 to 5(d) is that the valve is a "quasi-hermetic" valve. In a conventional ball valve, for example, the closure member is mounted on a stem, and this stem must protrude through the valve body in order to allow the orientation of the closure member to be varied. In consequence, it is necessary to provide an air tight seal around the stem where it passes through the valve body. In contrast, a valve of FIGS. 2–5(d) does not require a mechanical stem to be attached to the cylinder 12 in order to actuate the cylinder. No mechanical part is required to pass through the valve body 10, and it is only the inlets 13, 19, the outlets 14, 19', and the passage 30 (to be described below) that penetrate the valve body 10.

The piston 12 is able to move along the axis of the interior 11 of the valve body 10. When the input 13 is connected a source of fluid, such as compressed air, the fluid pressure at the input 13 would tend to force the sealing end face 17' of the piston 12 away from the valve face 16 of the valve body, connecting the input 13 to both outputs 14,15 regardless of the angular orientation of the piston 12 relative to the valve body. In order to prevent this, a biasing means is provided to counteract the fluid pressure at the input 13 and force the piston against the valve face 16 of the valve body. In the valve of FIG. 2, the biasing means comprises a control fluid input 19 provided in the end face of the hollow interior opposite to the valve face 16. A fluid such as compressed air is supplied to the control input 19 at a sufficient pressure such that the force exerted on the other end face 24 of the piston 12 will force the piston 12 against the sealing face 16 against the pressure of compressed air at the input 13. As long as the fluid pressure is maintained at the control input, the piston will be forced against valve face 16 and the valve will function as described above with reference to FIGS. 5(a)–5(d). The other end face 24 of the piston 12 thus acts as a control face.

In the embodiment shown in FIGS. 2 to 5(d), the fluid pressure applied to the input 19 is derived from the flow of compressed air supplied to the input 13. In this embodiment, the input 13 is connected to the control input 19 by means of a shut-off valve 31 and a one-way valve 32 which prevents air above the piston from flowing back to the inlet 13 (the shut-off valve 31 and the one-way valve 32 could alternatively be combined as a single valve).

An outlet 19' is provided in the other end face 20 of the valve body 10. When the valve 31 is shut the pressure at the control fluid inlet 19 drops as a result of leakage through the outlet 19' and the pressure at the input 13 forces the sealing end face 17' of the piston 12 away from the valve face 16 of the valve body. As the piston 12 moves away from the valve face 16 air above the piston is expelled through the outlet 19'.

Deriving the pressure at the control input 19 from the input flow of compressed air to the valve avoids the need to provide a separate source of pressurised gas to the control input 19 (although it is, in principle, possible to use a separate source of fluid to provide the pressure at the control input 19).

A vent passage 30 is provided below the piston 12, to ensure that the pressure below the piston 12 is normally lower than the pressure above the piston so that the piston is normally forced against the scaling face 16. The dimensions of the vent passage should be chosen so as to reduce the pressure below the cylinder sufficiently to ensure that the piston is normally biased against the sealing face 1, while not significantly reducing the pressure of compressed air supplied to the airguns from the output 14. If the pressure at the control input 19 were to be derived from a separate gas supply and not from the compressed air supply to the inlet 13, it is possible to omit the vent passage 30.

A further feature of the valve according to the second embodiment of the invention is that automatic operation of the valve can be easily effected. Automatic operation is achieved in this embodiment by the provision of a "worm" groove on the exterior face of the piston 12. This will now be explained with reference to FIGS. 6 and 7.

The exterior of the piston 12 is provided with a groove. The groove has four groove portions 21 that run parallel to the axis of the piston. These are provided at intervals of 90° around the exterior of the piston. In FIG. 6 the axial groove portions 21 are shown as extending over a significant portion of the total axial length of the piston 12, but the precise length of the axial groove portions 21 is not important.

The exterior of the piston 12 is also provided with four lateral groove portions 22. Each lateral groove portion is inclined so as to runs into one of the axial groove portions at a point near to, but away from, its upper end, and runs into the adjacent axial groove portion at a point near to, but away from, its lower end.

Four spring-loaded projections 23 are provided on the interior of the valve body 10 (only two of these projections are shown in FIG. 7). These are spaced at 90° intervals around the circumference of the interior 11 of the valve body. These projections rest in the groove. As shown in FIG. 7, the projections are positioned such that they are near the top of an axial groove portion when the sealing face 17 of the piston is pressed against the valve face 16 of the valve body 10.

It will be seen that, where a lateral groove portion 22 enters the upper end of an axial groove portion 21, at the intersection the lateral groove portion 22 is not as deep as the axial groove portion 21. Thus, a ledge 24 is defined because of the greater depth of the axial groove portion compared to the lateral groove portion. The ledge is parallel to the axis of the piston 12 and defines one edge of the axial groove portion 21.

The converse is true where a lateral groove portion 22 joins the lower end of an axial groove portion 21. At this point the lateral groove portion 22 is deeper than the axial groove portion 21, 50 that a ledge 25 is formed running across the axial groove portion 21 at an angle to the direction of the axial groove.

In the embodiment described these differences in depths of the groove portions are provided by making the lateral groove portions 22 with a constant depth, and making the depth of the axial groove portions vary. The axial groove portion becomes shallower towards the lower ledge 25. The invention is not, however, limited to this precise form, and the axial and lateral groove portions can have any depths provided that the ledges 24, 25 are formed.

As shown in FIG. 7, the spring loaded projections 23 are positioned such that when the piston 12 is biased against the sealing face of the valve body, the projections 23 are near the upper ends of the axial groove portions 21. That is, the projections will be in the upper portions 21a of the axial groove portions 21.

If the pressure at the control input 19 is reduced, the piston will be forced away from the sealing face 16 of the valve body as a consequence of the pressure of compressed air at the input 13. As the piston moves away from the sealing face 16 of the valve body, the groove portion 21 will move past the spring loaded projection 23. The piston 12 will not be able to rotate about its axis, because the projection 23 is constrained to stay in the axial groove portion 21. The presence of the ledge 24 where the inclined groove portion 22 intersects the upper end of the axial groove portion 21 means that the projection 23 cannot enter the inclined groove 22 portion. ("Upper" and "lower"are defined with respect to FIG. 6, and do not necessarily refer to the orientation of the valve in use.)

The length of the hollow interior of the valve body is sufficient for the distance of travel of the piston 12 to be substantially equal to the length of the axial groove portions 21, when the piston comes to rest, therefore, the projections 23 will be at or near the lower ends 21b of the axial groove portions. It is important that the distance of travel of the piston is sufficiently large for the inclined ledges 25 to have gone past the projections 23, 50 that the projections are in the regions of increased depth.

When a pressure is re-applied at the control input 19, the piston will be forced towards the sealing face 16 of the valve body. For the initial part of the movement of the piston, the projection 23 will run in the lower part 21b of the axial groove portion. However, when the piston 12 has travelled a sufficient amount that the inclined edge 25 encounters the projection 23; the piston 12 will be rotated by the action of the inclined ledge 25 on the projection, causing the projection 23 to engage in the lateral groove portion 22. Continued movement of the piston towards the valve face 16 will result in further rotation of the piston 12 owing to the interaction between the spring-loaded projection 23 and the lateral groove portion 22. The lateral groove portion 22 will function as a worm, and engagement of the projections 23 in the groove will derive rotation of the piston 12 from axial movement of the piston 12.

When the travel of the piston 12 is completed so that it abuts against the sealing face 16 of the valve body, the effect will be that it will have been rotated by 90° around its axis. Thus, the piston will have switched its state for example, from the state shown in FIG. 5(a) to the state of FIG. 5(b). Thus, automatic switching of the valve is obtained simply by releasing and re-applying a pressure at the control input 19.

When the pressure at the control input is released and re-applied, the angle of rotation of the piston will be determined by the angle between neighbouring axial grooves 21. If four equally spaced axial grooves are provided, a rotation of exactly 90° will be achieved each time that the pressure at the control inlet is released and re-applied. The amount of rotation of the piston is determined by the position of the axial grooves 21, and so is determined when the device is manufactured. Automatic rotation of the piston 12 is obtained by simply releasing and re-applying the pressure at the control input 19.

Furthermore, even if there should be any manufacturing errors in the position of, for example, one of the axial groove portions, releasing and re-applying the biasing of the control member four times will always cause a rotation of 360°, since each projection will have returned to its original axial groove portion. Thus, any manufacturing errors in positioning the groove on the surface of the piston do not accumulate as the piston is operated.

FIG. 8 is a partial enlarged view showing the construction of the spring-loaded projections 23. Each projection consists of a head 25 that is received in, and projects inwardly from a narrow diameter portion 26a of a bore 26 provided in the valve body 10. The bore 26 also has a large diameter portion 26b, and a retaining member 28 is inserted into the large diameter portion 26b of the bore 26. The retaining member 28 is secured in position, for example by means of a screw thread that engages a complementary screw thread provided on the interior of the large diameter portion 26b of the bore 26. The thread on the retaining member is preferably a self-sealing thread, so that an airtight seal is formed between the retaining member 28 and the valve body.

A biasing member 27 is provided in the reduced diameter portion 26a of the bore, between the projecting member 25 and the retaining member 28. In the embodiment of FIG. 8 the biasing means 27 is a coil spring that is under compression, and so tends to urge the projecting member 25 into the interior of the valve body (that is, to the left in FIG. 8). The piston 12 is arranged in the interior 11 of the valve body such that the projecting member 25 is received in one of the groove portions 21, 22 provided on the exterior of the piston 12.

The force exerted by the biasing means 27 on the projecting member 25 can be controlled to some extent by partially unscrewing the retaining member 28. The head of the retaining member 28 is provided with a recess for receiving a screwdriver or allan key, or other similar tool, to facilitate insertion and adjustment of the retaining member 28.

It will be understood that the second embodiment of the invention need not be embodied exactly as described above, but can be varied in many ways.

For example, although four projections 23 are provided in the embodiment described above, spaced at 90° intervals around the circumference of the interior 11 of the valve body 10, it is not necessary to provide four projections arranged in this way. In principle, only one projection 23 is required to provide the "worm effect" and derive rotation of the piston 12 from its axial movement. It is preferable, however, for more than one projection to be provided to provide proper support for the piston and increase robustness against shock loading in the valve.

It is not necessary for the groove on the exterior of the piston 12 to have the precise form illustrated in FIG. 6. For example, it is not necessary for the groove on the exterior of the piston 12 to have portions that are exactly parallel to the axis of the piston—it would be possible for all portions of the groove to be inclined with regard to the axis of the piston, so that a pair of adjacent groove portions formed a "V"-shape.

Any form of groove that will always produce rotation of the piston in a particular sense (ie, will always produce either clockwise rotation or anti-clockwise rotation) when the piston moves axially can be used. This will enable the valve to be put in any desired state simply by one or more operations of releasing and re-applying the biasing on the piston.

In the embodiment described above, the groove on the exterior of the piston is arranged to provide a rotation of substantially 90° when the pressure at the control inlet 19 is released and re-applied. In other embodiments, however, it might be desirable if a rotation of an angle other than 90° when the pressure at the control input is released and re-applied. For example, in a valve having three states, a rotation of 120° would be preferable, while a valve having five states would require a rotation of 72°. The present invention can be applied to such valves, simply by varying the arrangement of the groove on the surface of the piston 12.

The present invention is not limited to a valve having an input and two outputs, but could be applied to a valve having fewer or more than two outputs. The present invention can, in principle, also be applied to a valve having more than one input. All that is necessary is to modify the position of the input and outputs, the shape of the recess 18 in the sealing end face of the piston, and the angle of rotation produced when the pressure at the control input is released and re-applied, to achieve the desired operation of the valve. A valve having one input and one output, for example would have just two states and so would require a rotation of 180° when the pressure at the control inlet is released and re-applied.

In the embodiments described above the groove is disposed on the surface of the piston 10, and the projection(s) 23 are provided in the interior of the valve body 10. In principle, the groove could be provided on the interior of the valve body and the projection(s) on the exterior of the piston (although this might be more difficult to manufacture).

In order to produce an airtight seal between the piston 12 and the interior of the valve body 10 it is preferable to provide a sealing means between the piston 12 and the valve body 10. This can be, for example, a conventional sliding "O-ring" seal 29, as shown in FIG. 7.

In the embodiments described above the piston 12 is biased towards the valve face 16 of the valve body 10 by applying a fluid pressure at the control input 19. The present invention is not limited to this particular form of biasing, however, and any suitable means for biasing the piston in such a way that the biasing can be easily released and re-applied can in principle be used.

In the embodiments described above the end face 17' of the piston 12 seals against the valve face 16 of the valve body, so that sealing is effected by a pair of substantially flat surfaces. The aspect of the invention that provides rotation of the closure member as a result of releasing and re-applying the biasing of the closure member can, however, be applied to a valve in which sealing is effected by surfaces that are not flat. For example, a "T"-shaped through passage of the type shown in FIG. 1 could be provided in the closure member 12 shown in FIG. 6, rather than providing the recess 18. The seal would then be made between the cylindrical surface of the piston 12, and between the cylindrical surface of the interior of the valve body, and the input and outputs would be provided in the cylindrical portion of the interior surface of the valve body in a manner similar to that of the prior art valve of FIG. 1. A valve of this general construction would still achieve the effect that releasing and re-applying the biasing of the piston 12 would cause rotation of the piston by an amount predetermined by the form of the groove provided on the exterior of the piston, and thus provide advantages over the prior art.

Similarly, the arrangement in which the input and outputs 13, 14, 15 are provided in a flat valve face of the valve body, and a recess is provided in the sealing face 17' of the closure member could be applied to a valve in which the rotation of the closure member is derived by conventional actuation means. Such a valve would achieve the advantage of effecting sealing between flat faces.

What is claimed is:

1. A valve comprising:
   a valve face having at least one input and at least one output; and
   a closure member having a sealing face, the sealing face being adapted to seal against the valve face whereby, by varying the orientation of the closure member relative to the valve face, the input can be connected or isolated from the output;
   wherein the closure member is normally biased towards the valve face; and
   wherein releasing and re-applying the biasing on the closure member causes the orientation of the closure member relative to the valve face to change thereby to change the state of the valve.

2. A valve as claimed in claim 1 wherein the valve face and the sealing face are substantially flat.

3. A valve as claimed in claim 1, wherein releasing and re-applying the biasing on the closure member causes the closure member to rotate about its axis relative to the valve face.

4. A valve as claimed in claim 3 wherein a recess is formed in the sealing face of the closure member, the recess being so shaped and go positioned that rotation of the closure member about its axis relative to the valve face changes the position of the recess relative to the input and the output thereby to change the state of the valve.

5. A valve as claimed in claim 4, wherein the recess has a cross-section that is substantially L-shaped.

6. A valve as claimed in claim 5 wherein releasing and re-applying the biasing on the closure member causes the closure member to rotate by substantially 90° about an axis substantially perpendicular to the sealing face.

7. A valve as claimed in claim 1, wherein the closure member is biased towards the valve face by a fluid pressure applied to a control face of the closure member.

8. A valve as claimed in claim 7 wherein the fluid pressure applied to the control face of the closure member is derived from a fluid pressure applied to the input of the valve.

9. A valve as claimed in claim 1, wherein releasing the biasing on the closure member causes the closure member to move away from the valve face, and re-applying the biasing causes the closure member to move toward the valve face.

10. A valve as claimed in claim 9 and provided with means for deriving rotation of the closure member from its movement.

11. A valve as claimed in claim 10 wherein the means for deriving rotation of the closure member comprise a groove provided in the surface of the closure member and a projection provided on the interior of the valve body the projection engaging, in use, in the groove.

12. A valve as claimed in claim 11 wherein the groove has at least first and second portions that are generally oppositely directed and that intersect with one another, at least one of the groove portions being inclined with respect to the axis of the closure member.

13. A valve as claimed in claim 12 wherein, at the intersection between the first groove portion and the second groove portion, the depth of the second groove portion is greater than the depth of the first groove portion.

14. A valve as claimed in claim 11 wherein the height of the projection is variable.

15. A valve as claimed in claim 14 wherein the projection is spring loaded.

16. A valve as claimed in claim 1, wherein first and second outputs are provided on the valve face, and wherein dependent on the orientation of the closure member relative to the valve face the input can be connected to the first output or to the second output or to both the first and second outputs or can be isolated from both the first and second outputs.

17. A valve as claimed in claim 16, wherein the input and the first and second outputs are arranged at three corners of a rectangle and wherein a recess in the sealing face of the closure member has a substantially "L"-shaped cross-section.

18. A seismic source comprising:
   a valve comprising:
      a valve face having at least one input and at least one output; and a closure member having a sealing face, the sealing face being adapted to seal against the valve face whereby, by varying the orientation of the closure member relative to the valve face, the input can be connected or isolated from the outlet;
      wherein the closure member is normally biased towards the valve face, and wherein releasing and re-applying the biasing on the closure member causes the orientation of the closure member relative to the valve face to change thereby to change the state of the valve; and
      wherein dependent on the orientation of the closure member relative to the valve face the input can be connected to the first output or to a second output or to both the first and second outputs or can be isolated from both the first and second outputs; and
   an air supply connected to the input of the valve; and first and second airguns connected to respective ones of the first and second outputs of the valve;
   wherein the valve is operable to selectively isolate the first airgun from the air supply, or to isolate the second airgun from the air supply, or to isolate both airguns from the air supply, or to connect both airguns to the air supply.

19. A seismic source as claimed in claim 18, wherein a recess is formed in the sealing face of the closure member, the recess being so shaped and so positioned that rotation of the closure member about its axis relative to the valve face changes the position of the recess relative to the input and the output thereby to change the state of the valve.

* * * * *